(12) United States Patent
Brown et al.

(10) Patent No.: US 6,886,988 B2
(45) Date of Patent: May 3, 2005

(54) FIBER OPTIC GUIDE PIN

(76) Inventors: Matthew A. Brown, 819 9$^{th}$ Ave., NE., Hickory, NC (US) 28601; Joseph L. Graham, 26 8th Ave., NE., Hickory, NC (US) 28601; Narcis Adam, 2474 23$^{rd}$ St., NE., Hickory, NC (US) 28601

( * ) Notice: Subject to any disclaimer, the term of this patent is extended or adjusted under 35 U.S.C. 154(b) by 0 days.

(21) Appl. No.: 10/336,078

(22) Filed: Jan. 3, 2003

(65) Prior Publication Data

US 2004/0130703 A1 Jul. 8, 2004

(51) Int. Cl.$^7$ .................................................. G02B 6/36
(52) U.S. Cl. ........................................................ 385/53
(58) Field of Search .................................. 385/53–94

(56) References Cited

U.S. PATENT DOCUMENTS

| 4,183,619 A | * | 1/1980 | Makuch | 385/82 |
| 2001/0036342 A1 | | 11/2001 | Knecht et al. | 385/84 |
| 2002/0102068 A1 | | 8/2002 | Ohtsuka et al. | 385/78 |

FOREIGN PATENT DOCUMENTS

JP          09-068627        3/1997

* cited by examiner

Primary Examiner—Tu T. Nguyen
(74) Attorney, Agent, or Firm—Michael Leetzow (57) ABSTRACT

A fiber optic guide pin is provided that has an end portion that is smooth and continuous. The smooth and continuous portion may be shaped to approximate an ellipse or a parabola. The end portion may also have a generally flat portion that is surrounded by the smooth and continuous portion.

7 Claims, 6 Drawing Sheets

FIBER OPTIC GUIDE PIN

The present invention relates to a fiber optic guide pin, and more particularly, a fiber optic guide pin that reduces guide hole wear in fiber optic connectors with a smooth shape.

There are prior art guide pins including, for example, guide pins that are chamfered—both single and double chamfered, and those with a simple radius. However, each of the prior art guide pins have an issue with either causing guide hole wear, skiving of the holes, or guide pins that do not easily position themselves into the guide hole with minimal damage to the guide hole.

Accordingly, the present invention is directed to a fiber optic guide pin that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a guide pin for aligning ferrules that includes an elongated cylindrical element, the elongated cylindrical element having a first end and a second end, the first end having a configuration to be insertable into a first ferrule and the second end configured to engage an opening in a second ferrule, the second end being symmetrical about a longitudinal axis therethrough and having a smooth, continuous surface.

In another aspect, the invention provides for a guide pin for aligning ferrules that includes an elongated cylindrical element, the elongated cylindrical element having a first end, a second end, a longitudinal axis therethrough, and a radius, the first end having a configuration to be insertable into a first ferrule, and the second end configured to engage an opening in a second ferrule, the second end having a smooth, continuous surface and a point at a predetermined radial distance from the longitudinal axis on the smooth, continuous surface has a slope at the point that is the same as a slope of a line tangent to the point, the tangent line forming an angle with the longitudinal axis that is smaller than an angle formed with the longitudinal axis by a line tangent to a point at the predetermined radial distance from the longitudinal axis on a curved surface that has a radius equal to the radius of the guide pin.

In yet another aspect, the invention is directed to a guide pin for aligning ferrules that includes an elongated cylindrical element, the elongated cylindrical element having a first end and a second end, the first end having a configuration to be insertable into a first ferrule; and the second end configured to engage an opening in a second ferrule, the second end being symmetrical about a longitudinal axis therethrough and having a smooth, continuous curved surface on at least a portion thereof.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figure 1:
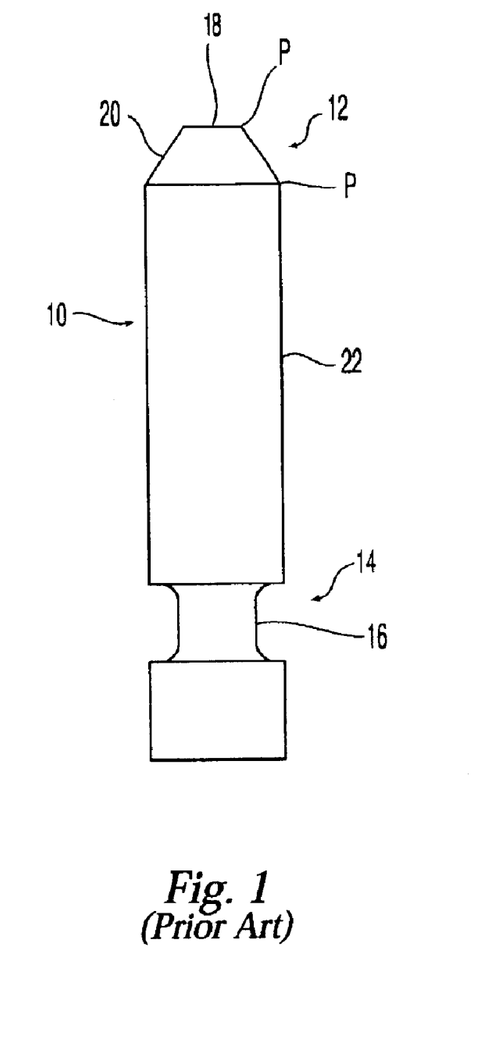
FIG. 1 is a front elevational view of a prior art chamfered guide pin.

A prior art fiber optic guide pin 10 is illustrated in FIG. 1. The fiber optic guide pin has a first end 14 and a second end 12. The first end 14 is shown with a reduced portion 16 that engages a fiber optic guide pin holder, but the first end may also be straight—not have the reduced portion 16—or be of any appropriate configuration to be secured in a fiber optic ferrule, sleeve, etc. The second end 12 has a generally flat end surface 18 and a chamfered portion 20. The chamfered portion 20 joins the end surface 18 with the outer surface 22 of the fiber optic guide pin 10. The points P at which the chamfered portion 20 joins the end surface 18 and the outer surface 22 are generally sharp and cause skiving and guide hole wear in a ferrule (not shown) that is to be aligned with the ferrule in which the fiber optic guide pin is secured. As is known in the art, fiber optic guide pins are generally cylindrical and have a predetermined diameter, which is generally about 0.7 mm.

Figure 2:
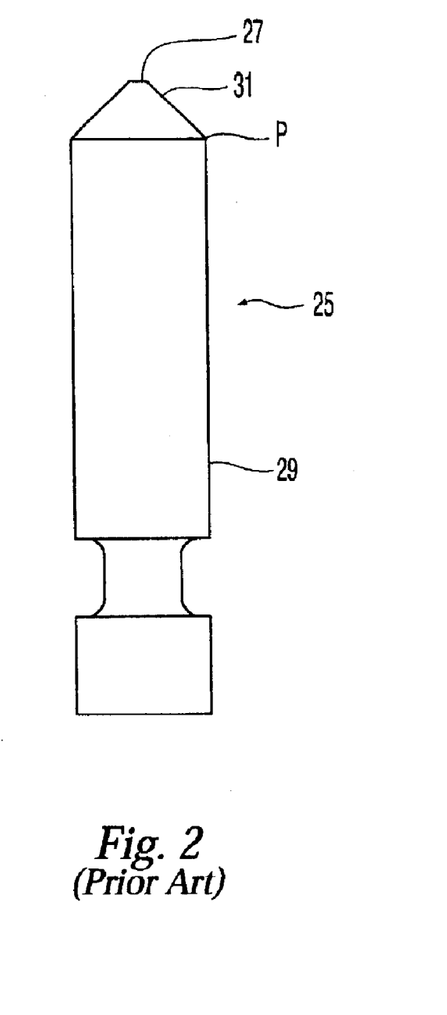
FIG. 2 is a front elevational view of another prior art chamfered guide pin.
Figure 3:
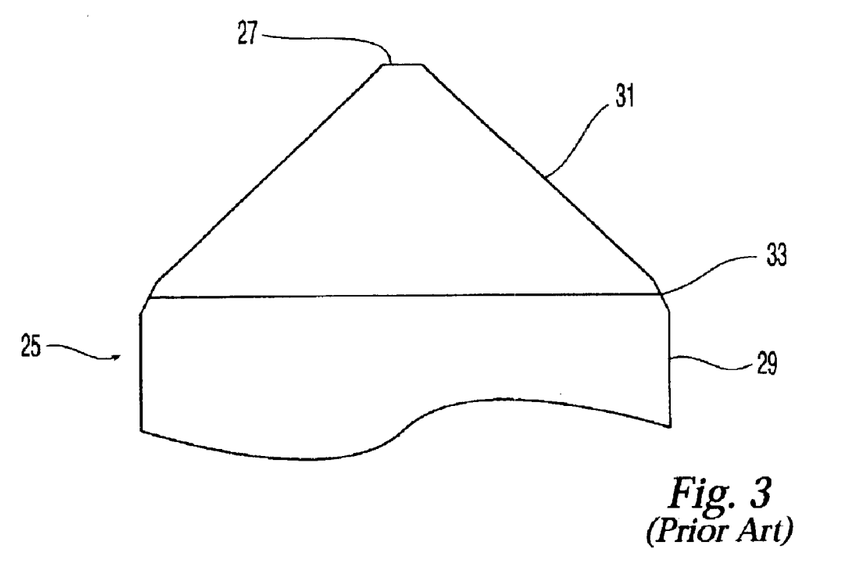
FIG. 3 is a partial view of a prior art chamfered guide pin with the edges broken.

An alternative prior art fiber optic guide pin 25 is shown in FIG. 2. This fiber optic guide pin is similar to that in FIG. 1, but the generally flat end surface 27 is smaller than the end surface 18 on the guide pin 10. The smaller end surface helps to eliminate one point P at which the guide pin engages the guide hole in the ferrule. However, the point P at the junction of outer surface 29 and the chamfered surface 31 is sharper than in the first fiber optic guide pin 10 because of the sharper angle of the chamfered surface 31. One way to avoid such a sharp is to break the point P and make a secondary surface 33 as shown in FIG. 3. Breaking the sharp point P to create surface 33 requires a secondary step that is costly and time consuming. Additionally, if the step is done by hand, the surface 33 may not be exact and surfaces 33 are not consistent from piece to piece.

Figure 4:
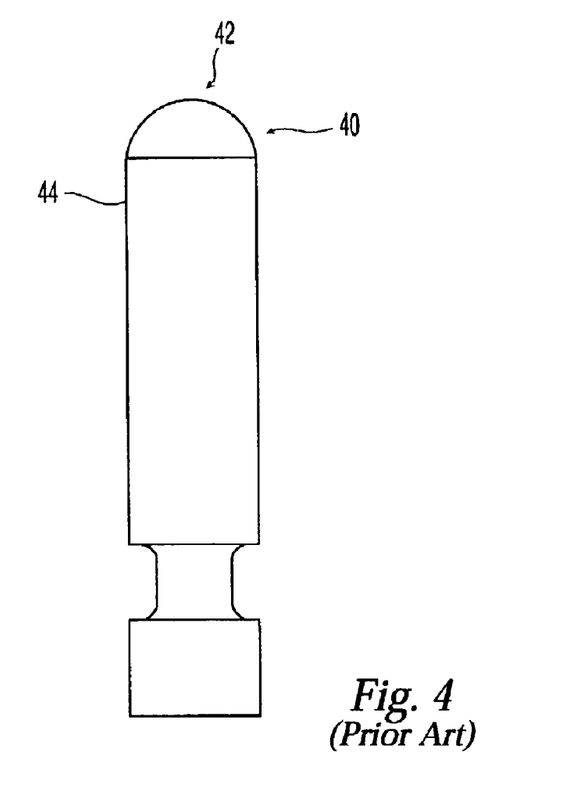
FIG. 4 is a front elevational view of a prior art guide pin with a simple radius.

Another prior art fiber optic guide pin 40 is shown in FIG. 4. The fiber optic guide pin 40 is similar to those in FIGS. 1–3, except that the second end 42 is generally round and has a radius r that is the same as the radius of the fiber optic guide pin. However, fiber optic guide pin 40 does not solve the problems of the other fiber optic guide pins because the round end portion 42 does assist in directing the guide pin into the guide hole of a ferrule. The radius of the second end 42 is relatively large and acts more like a flat end surface than a rounded surface, unless the guide pin 40 engages the guide hole relatively close to the outer edge 44. If the guide pin 40 engages the guide hole close to outer edge 44, the guide pin 40 will slide into the guide hole relatively easily. However, this is not always the case, and increased wear is also seen with the guide pin 40.

Figure 5:
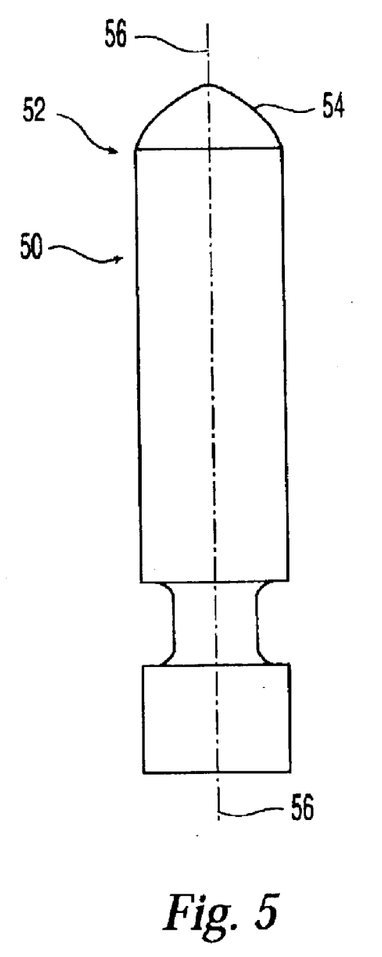
FIG. 5 is a front elevational view of a guide pin according to one embodiment of the present invention.

A first embodiment of a fiber optic guide pin 50 according to the present invention is illustrated in FIG. 5. The guide pin 50 is similar to the other guide pins (including its general structure), except that the second end 52 has a generally smooth, continuous surface 54. The second end 52 of guide pin 50 has a shape that corresponds generally to a parabola. As such, the surface of the second end 52 is smooth, meaning that it has no discontinuities as did the guide pins 10,25 (as at points P) due to the chamfer. A parabola's general equation is $x^2=-4py$, where x is radial distance from the longitudinal axis (see FIG. 8) and y is the distance along the longitudinal axis of the pin, with the second end being the origin. However, since the origin of the parabola is taken to be the center of the pin at the second end 52, i.e., along longitudinal axis 56 through the center of the pin, then the above equation becomes $y=r^2/4p$, where r is the radius of the guide pin and variable p is preferably about 0.06 and most preferably 0.056. This results in a second end that, while smooth, is more streamlined and more easily enters a guide hole with minimal wear and skiving.

Figure 6:
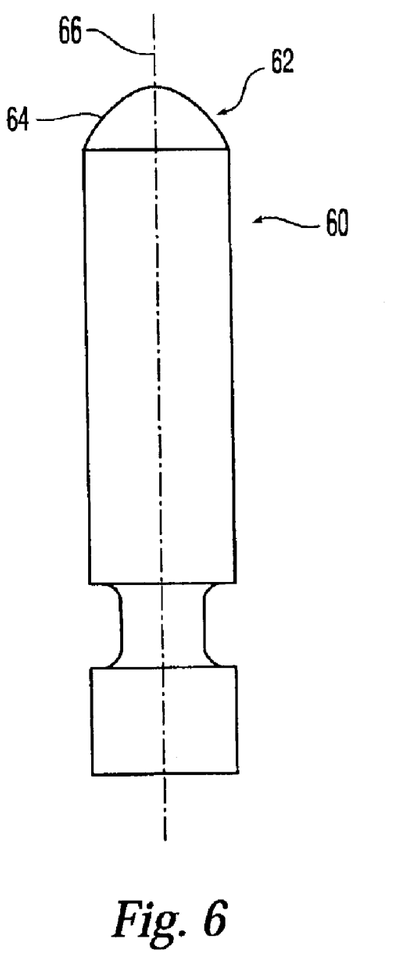
FIG. 6 is a front elevational view of a guide pin according to another embodiment of the present invention.

A second embodiment of a fiber optic guide pin 60 according to the present invention is illustrated in FIG. 6. This embodiment of fiber optic guide pin 60 is similar to that of fiber optic guide pin 50, except that the second end 62, which also has a generally smooth, continuous surface 64, generally corresponds to an ellipse. The general equation for an ellipse is $$\frac{x^2}{b^2}+\frac{y^2}{a^2}=1.$$

Again, if the center of the pin along the longitudinal axis 66 is taken to be the origin, then the equation for the ellipse and the surface 64 becomes $$y=b\sqrt{1-(x/a)^2}-a$$

where $1.00 \leqq 2a \leqq 1.20$ mm and where $0.69 \leqq b \leqq 0.70$ mm. Similar to fiber optic guide pin 50, the surface 64 is more streamlined than a simple radius and allows for less wear and skiving of the guide hole.

Figure 7:
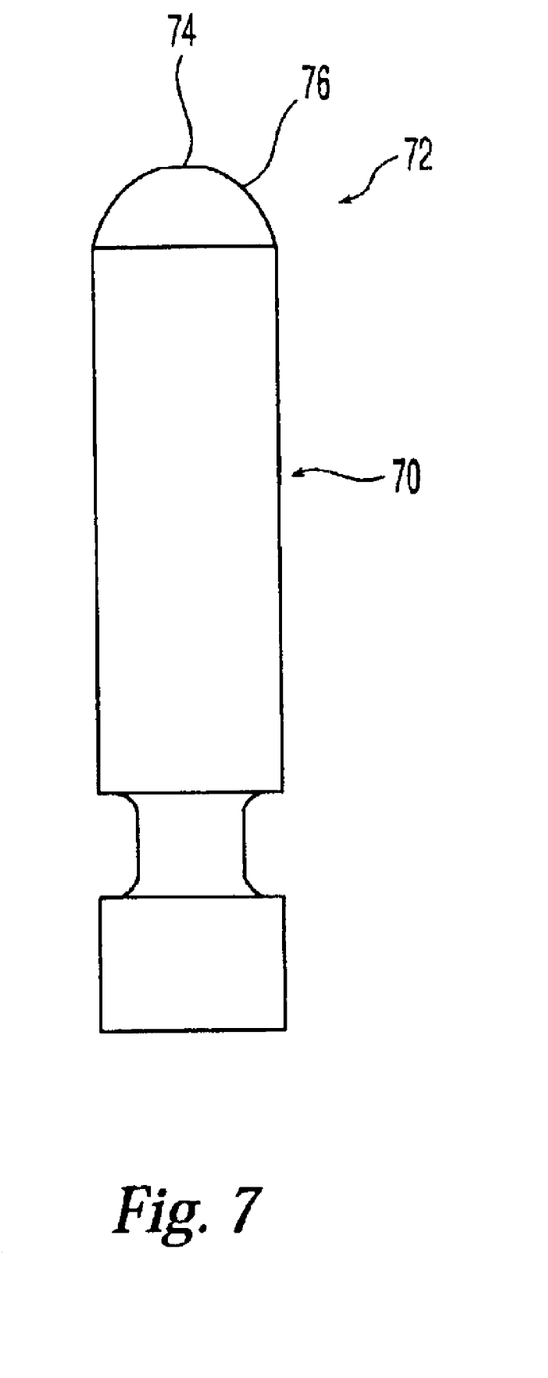
FIG. 7 is a front elevational view of a guide pin according to another embodiment of the present embodiment.

Another embodiment of a fiber optic guide pin according to the present invention is also illustrated in FIG. 7. Fiber optic guide pin 70 is similar to those in FIGS. 5 & 6, but instead of having a completely smooth, continuous surface that completely covers the second end portion 72, this guide pin has a generally flat end portion 74. Fiber optic guide pin 70 also has a generally smooth, continuous surface 76 that may be either generally shaped like an ellipse or a parabola, or any other curved surface. While shown to be relatively small, the generally flat portion 74 can be as large or as small as desired. However, the larger the generally flat portion is, the more dramatic the curve on the smooth, continuous surface 76 must be. As indicated above, a break between surfaces provides a point (or even a surface) that causes guide hole wear and skiving. Therefore, if the generally flat portion 74 becomes too large, the more likely that there will be a break that could potentially damage the guide hole. Preferably, the smooth, continuous surface 76 has a radius that is generally smaller than the radius of the fiber optic guide pin 70 itself It should also be noted that the radius of the curved portion 76 need not be a fixed radius, but can vary as in the ellipse or parabolic shapes described above.

Figure 8:
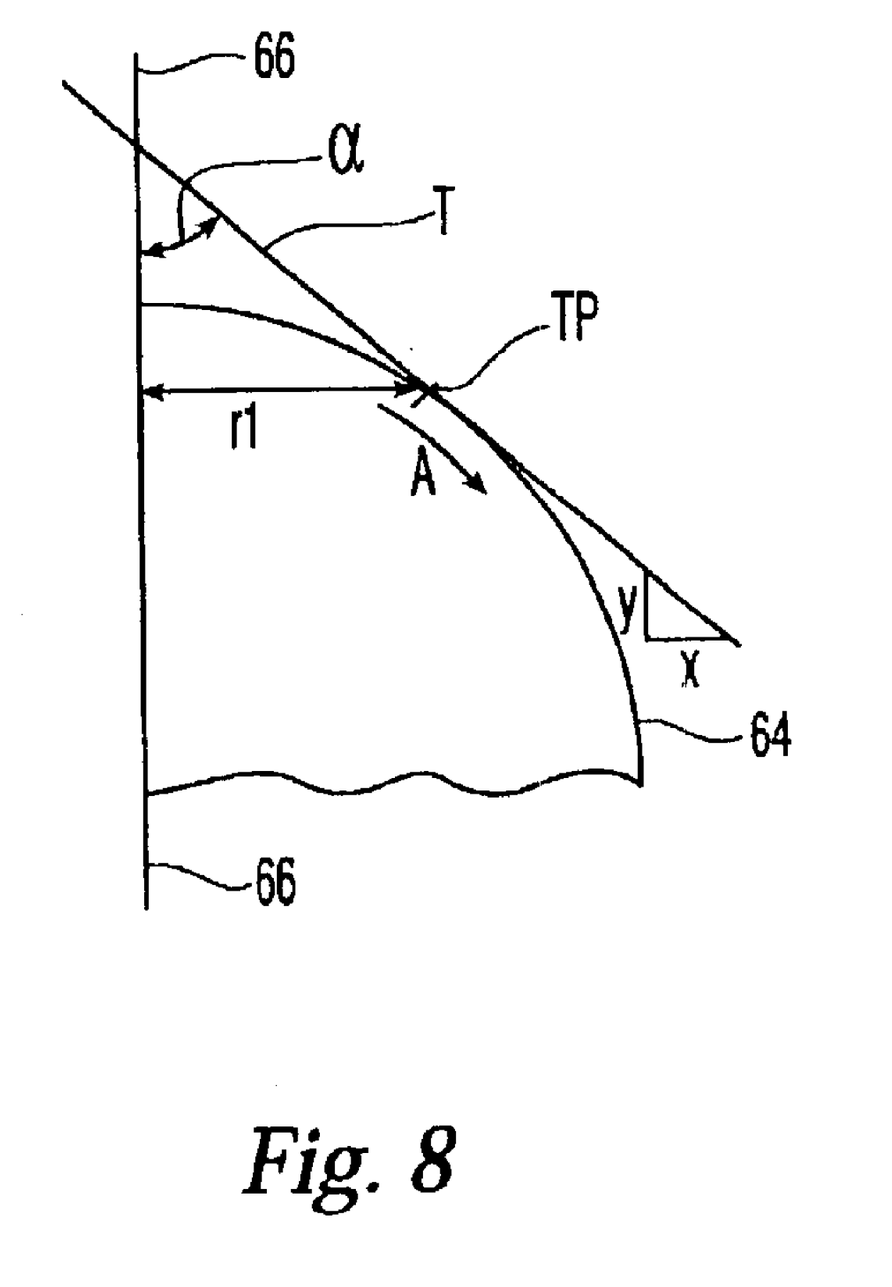
FIG. 8 is a partial view of an end portion of a fiber optic guide pin according to one embodiment of the present invention.
Figure 9:
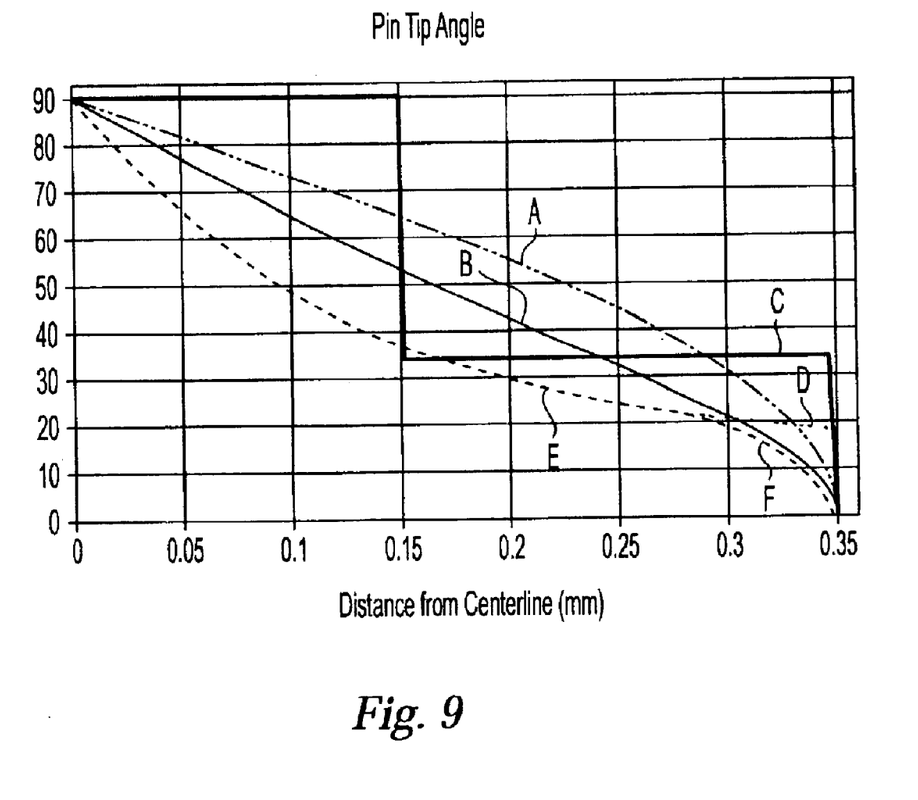
FIG. 9 is a graph illustrating the angle of tangent lines relative to a longitudinal axis for a variety of fiber optic guide pins.

The generally smooth, continuous surface 54,64,76 may also be defined in the following manner and in conjunction with FIG. 8. Although FIG. 8 shows a portion of the fiber optic guide pin 60 of FIG. 6, the principles described below could be applied to any of the fiber optic guide pins according to the present invention. As shown, a tangent line T is drawn at a point TP, the point TP is a distance $r_1$ from the center line of the guide pin (or the longitudinal axis 66), and intersects the longitudinal axis 66. The tangent line T forms an angle $\alpha$ with the longitudinal axis 66 and has a slope (y/x). As can be seen in FIG. 8, the angle $\alpha$ will be smaller (and the slope will be greater) as the point TP moves along the surface 64 of the guide pin 60 in the direction of arrow A and increases in distance from the center line 66. Illustrated in FIG. 9 is the angle of the tangent line at points along the surface of the second end of the guide pin for five different surfaces: the chamfer as shown in FIG. 1 (line C), the simple radius (line A), an ellipse (line B), a parabola (line E and D) and a modified parabola (line E and F). The modified parabola is the same as the parabolic shape, except that a true parabola would have a sharp break at the outer surface of the guide pin (see lines E and D). Therefore, the modified parabola varies from the true parabola so that it does not have a break at the outer edge of the guide pin (see lines E and F). Elimination of the break can be done in a variety of ways, including an additional step, done in an original grinding step, or smoothed in any other acceptable manner. As shown in FIG. 9 for the chamfer, the angle for the chamfer is relatively constant over the three different surfaces: the flat at the center of the pin, the chamfered portion and the break to the outer surface. The simple radius has a relatively large angle with the longitudinal axis at any given distance r from the longitudinal axis relative to the ellipse and the parabola. In fact, the present invention is directed to any smooth, continuous surface that has an angle with the longitudinal axis that is less than the angle for the simple radius, i.e., has a line that is below the line for the simple radius on the graph in FIG. 9.

It will be apparent to those skilled in the art that various modifications and variations can be made in the fiber optic guide pin of the present invention without departing from the spirit or scope of the invention. Thus, it is intended that the present invention cover the modifications and variations of this invention provided they come within the scope of the appended claims and their equivalents.

We claim:

1. A guide pin for aligning ferrules comprising:
    an elongated cylindrical element, the elongated cylindrical element having a first end, a second end, a longitudinal axis therethrough, and a radius;
    the first end having a configuration to be insertable into a first ferrule; and
    the second end configured to engage an opening in a second ferrule, the second end having a smooth, continuous surface and a point at a predetermined radial distance from the longitudinal axis on the smooth, continuous surface has a slope at the point that is the same as a slope of a line tangent to the point, the tangent line forming an angle with the longitudinal axis that is smaller than an angle formed with the longitudinal axis by a line tangent to a point at the predetermined radial distance from the longitudinal axis on a curved surface that has a radius equal to the radius of the guide pin.

2. A guide pin for aligning ferrules comprising:

an elongated cylindrical element, the elongated cylindrical element having a first end and a second end;

the first end having a configuration to be insertable into a first ferrule; and the second end configured to engage an opening in a second ferrule, the second end being symmetrical about a longitudinal axis therethrough and having a smooth, continuous surface, wherein the guide pin has a radius and a point at a predetermined radial distance from the longitudinal axis on the smooth, continuous surface, the smooth, continuous surface has a slope at the point that is the same as a slope of a line tangent to the point, the tangent line forming an angle with the longitudinal axis that is smaller than an angle formed with the longitudinal axis by a line tangent to a point at the predetermined radial distance from the longitudinal axis on a curved surface that has a radius equal to the radius of the guide pin.

3. The guide pin of claim 2, wherein the smooth, continuous surface is defined by the equation $x^2/b^2+y^2/a^2 32\ 1$, wherein a and b are constants.

4. The guide pin of claim 3, wherein a is between about 0.5 and 0.6 mm and b is between about 0.345 and 0.35 mm.

5. The guide pin of claim 2, wherein the smooth, continuous surface generally corresponds to a parabola.

6. The guide pin of claim 5, wherein the smooth, continuous surface is defined by the equation $x^2=-4py$, wherein p is a constant.

7. The guide pin of claim 6, wherein p is about 0.056 mm.

* * * * *

UNITED STATES PATENT AND TRADEMARK OFFICE
CERTIFICATE OF CORRECTION

PATENT NO. : 6,886,988 B2  Page 1 of 1
DATED : May 3, 2005
INVENTOR(S) : Matthew A. Brown, Joseph L. Graham and Narcis Adam It is certified that error appears in the above-identified patent and that said Letters Patent is hereby corrected as shown below:

Column 6,
Line 9, "equation $x^2/b^2 + y^2/a^2 32\ 1$" should be changed to -- equation $x^2/b^2 + y^2/a^2 = 1$ --.

Signed and Sealed this

Fifth Day of July, 2005

JON W. DUDAS
*Director of the United States Patent and Trademark Office*